United States Patent
Baker, III

(10) Patent No.: US 6,675,102 B1
(45) Date of Patent: Jan. 6, 2004

(54) METHOD OF PROCESSING SEISMIC GEOPHYSICAL DATA TO PRODUCE TIME, STRUCTURE, VOLUMES

(75) Inventor: Robert Allison Baker, III, Stafford, TX (US)

(73) Assignee: Seismic Micro-Technology, Inc., Houston, TX (US)

(*) Notice: Subject to any disclaimer, the term of this patent is extended or adjusted under 35 U.S.C. 154(b) by 0 days.

(21) Appl. No.: 10/242,987

(22) Filed: Sep. 13, 2002

(51) Int. Cl.7 ............................................. G01V 1/28
(52) U.S. Cl. ................................. 702/14; 702/16
(58) Field of Search ............................. 702/14, 16, 17

(56) References Cited

U.S. PATENT DOCUMENTS

| | | | | |
|---|---|---|---|---|
| 4,852,004 A | * | 7/1989 | Manin | 702/17 |
| 5,995,907 A | * | 11/1999 | Van Bemmel et al. | 702/16 |
| 6,278,949 B1 | * | 8/2001 | Alam | 702/16 |
| 6,463,388 B1 | * | 10/2002 | Martinez | 702/17 |
| 2003/0018436 A1 | * | 1/2003 | Stark | 702/14 |
| 2003/0018437 A1 | * | 1/2003 | Stark | 702/14 |
| 2003/0023383 A1 | * | 1/2003 | Stark | 702/14 |

* cited by examiner

Primary Examiner—Marc S. Hoff
Assistant Examiner—Anthony Gutierrez
(74) Attorney, Agent, or Firm—Duane Morris LLP

(57) ABSTRACT

The method of the present invention relates to the field of seismic data interpretation for the purpose of finding natural occurrences of oil and/or gas in a geophysical formation. The invention relates to a method of processing seismic geophysical data to produce time structure volumes. The method of the present invention is capable of displaying the position and orientation of layered rocks in the subsurface of the earth.

20 Claims, 9 Drawing Sheets

METHOD OF PROCESSING SEISMIC GEOPHYSICAL DATA TO PRODUCE TIME, STRUCTURE, VOLUMES

BACKGROUND OF THE INVENTION

1. Field of the Invention

The method of the present invention relates to the field of seismic data interpretation for the purpose of finding natural occurrences of oil and/or gas in a geological formation. The invention relates to a method of processing seismic geophysical data to produce time structure volumes. The method of the present invention is capable of displaying the position and orientation of layered rocks in the subsurface of the earth.

2. Description of the Prior Art

Seismic data are produced by transmitting an acoustic signal into the Earth and recording echoes of this signal. Various means are used in the prior art to produce an acoustic signal, such as dynamite. The Earth typically consists of layers of rock, and the acoustic properties of the rock typically change from layer to layer. Echoes are caused by changes in acoustic properties, and surfaces that produce echoes constitute "surfaces of reflection". The geometric relationships of these layers, as expressed by the surfaces of reflection, are collectively known as the "structure of the subsurface".

It is desirable for interpreters to know whether the layers are tilted and the degree of tilt, and whether they form curved rather than planar surfaces, and whether the layers are broken or discontinuous. Subsurface rocks are generally porous, like beach sand but with less ability to absorb fluids, and contain either water, oil, or gas. Oil and gas are lighter than water and float upward in the subsurface as they do at the surface. The path of movement and the cessation of movement is in large part dependent on the geometry of the subsurface layers in which the fluids move, which makes this geometry of interest to seismic interpreters.

The geometry also allows the interpreter to deduce various geological characteristics, including how the rocks were deposited This history can be important in more sophisticated analyses regarding the generation of oil and gas and the distribution of pores in the subsurface.

To detect geometric relationships, echoes must be collected over an area, so seismic receivers are typically laid out along a line or in a grid pattern over the surface of the Earth. Prior art methods employ arrays of acoustic receivers to collect these echo signals. Capture over an area permits comparison of echoes from location to location. Prior art methods record echo signal amplitudes for each receiver as a function of time. These signals are knows as "echo trains." Prior art echo trains may display time on a vertical axis and amplitude on a horizontal axis.

When echo trains from the grid locations are organized for display as a whole, the collection is referred to a "seismic volume" because it is the seismic representation of a volume of subsurface rock. FIG. 1 depicts a typical seismic trace as detected by a receiver at the surface. In FIG. 1, time is depicted on the vertical axis in seconds. Amplitude is shown on the horizontal axis. The strength of the echo rises and falls over a period of several seconds, and this rise and fall with time is recorded for processing and analysis. A single echo train is referred to as a "seismic trace".

There are sophisticated techniques used in the prior art for improving the signal quality of seismic traces, such as by averaging echo trains from several receivers. "Interpretation" of seismic data refers to deducing the possible existence and location of oil and gas in the volume of rock represented by the seismic data. Prior art methods have employed the study of "lines" of seismic data. A line consists of data from one row or column of the grid of receivers described above. A line display provides a profile view of the seismic echoes so that one can readily see differences in the chain of echoes along the line.

FIG. 2 depicts a typical seismic line, and FIG. 3 shows in map view the location of this line in a grid of lines. A seismic volume consists of the collection of all the seismic lines or all of the seismic traces. The seismic volume may be sliced at various angles to display information of interest. A vertical slice through a seismic volume results in a display of amplitude data as a function of time for a line, as shown in FIG. 2. A vertical line intersects the dotted horizontal axis near the top of FIG. 2. The trace shown in FIG. 1 is also depicted below this vertical line in FIG. 2. For background purposes, FIG. 3 shows a typical grid of seismic data lines in map view. The location of every tenth north-south and east-west line is drawn in map coordinates. The location of the east-west section shown in FIG. 2 is indicated by the heavy dashed line in FIG. 3.

A horizontal slice through the seismic volume is referred to as a "time slice." A time slice depicts amplitude data as a function of spatial position, as shown in FIG. 4. FIG. 4 depicts a horizontal slice across each of the vertical sections at a time of 2.758 seconds. The circle traces in FIG. 2 correspond to the circled area shown in FIG. 4. By comparing FIGS. 2 and 4, one can see that the dark amplitudes of FIG. 2 at 2.758 seconds are part of sinuous north-south trend. Vertical and horizontal slices through the seismic volume to display amplitude data as a function of time and spatial position, respectively, have been employed in the prior art.

As seen in FIG. 4, the data display is blurred and lacks crisp detail. This lack of detail translates to a lack of precise information regarding the structure of the subsurface. The present invention provides an improved method of processing and displaying seismic volume data to enhance structural resolution.

SUMMARY OF THE INVENTION

The present invention provides a method for making structural relations easily seen in areal view. The present invention provides an enhanced understanding of the structure of the subsurface formation without interpreting data line by line. Application of the invention may save significant time and improve accuracy as well as thoroughness in the search for oil and gas. The invention is described in terms of seismic volumes when the vertical measurement is time. The present invention also applies when the vertical axis is measured in depth. If the vertical measurement is depth, the present invention uses depth slices, instead of time slices. Accordingly, in the present description of the invention, the term "time" can be replaced with "depth" where the vertical axis is measured in depth.

The present invention converts the information contained in a three dimensional volume of seismic trace data to multiple arrays of time structure values which can be collectively displayed as a time structure volume to more accurately and clearly depict the structure of the geological formations from which the seismic trace data was obtained.

A time structure display resulting from practicing the present invention is shown in FIG. 5. The amplitude information of FIG. 4 is replaced by structural information in FIG. 5. FIG. 4 shows the amplitudes of traces where they intersect the time slice, and the display has the same general lower left to upper right trend as is shown in FIG. 5; however, FIG. 4 lacks the structural detail and crispness of FIG. 5. Independent of its crispness, FIG. 4 does not show events (characteristic changes in amplitude, such as peaks or troughs), or where events intersect a time slice, or the direction in which an event is to be found below the time slice. FIG. 4 gives an indication of the geophysical response of rock at a given time slice; however, it does not illuminate the structure of the geology. The time slice view represented by FIG. 4 does not convey the same information as conveyed in FIG. 5. In FIG. 5, a partially formed dome is shown in the circled area. Features like these are of interest because they form upside down basins that may capture oil and gas moving toward the surface. Several lines would have to be interpreted and the correct seismic event would have to be traced on each line in order to detect this feature without a time structure display. FIG. 5 provides useful information that has previously required tedious study of many cross sections over extended periods of time. The present invention provides a far more efficient manner of obtaining such information.

DESCRIPTION OF THE PREFERRED EMBODIMENTS

The present invention is directed toward a method of processing seismic geophysical data to produce time structure volumes. In a preferred embodiment, this method comprises transmitting acoustic signals into the earth from an acoustic source displaced or deployed over a target area, as shown in block 10 of FIG. 8a.

Figure 8:
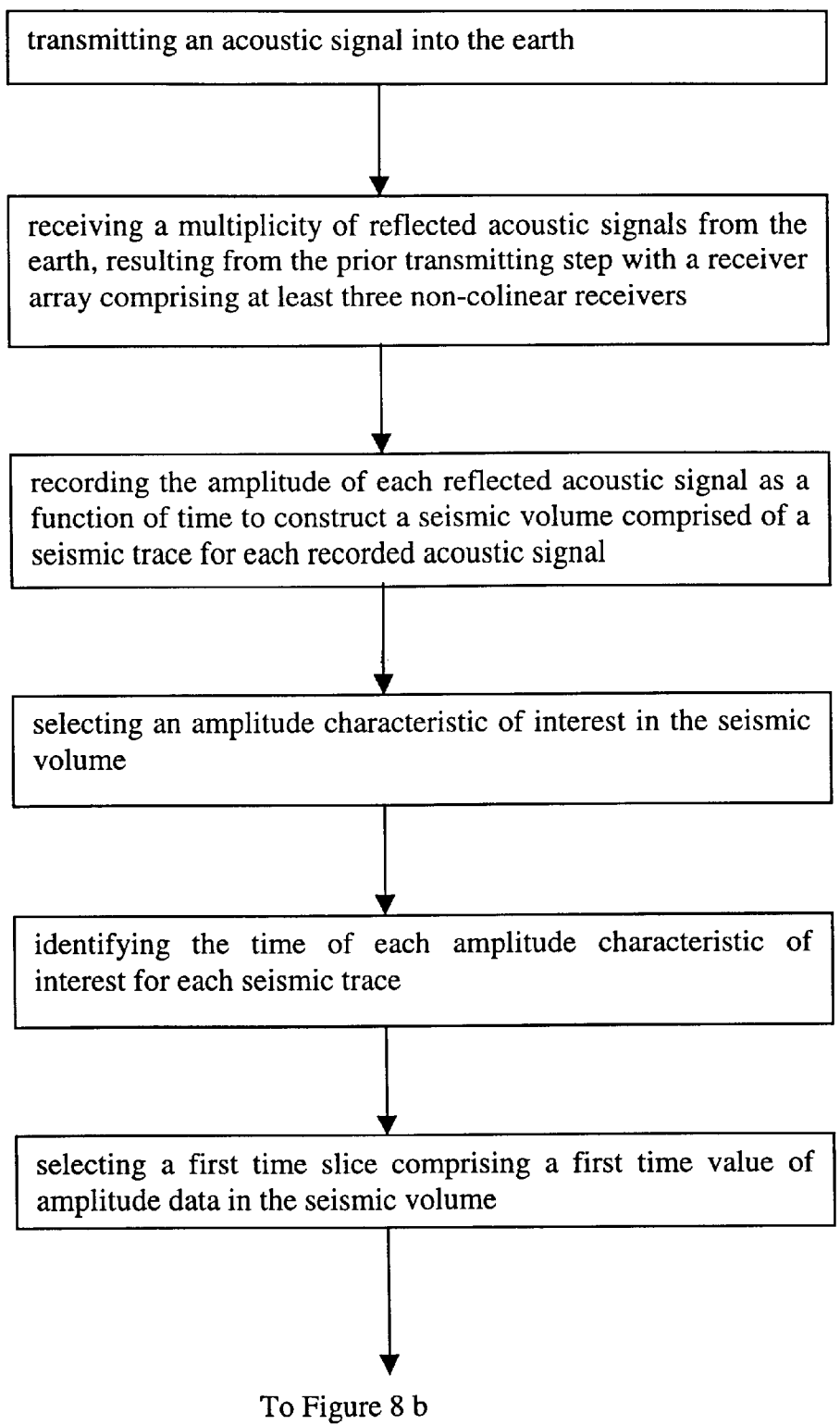
FIGS. 8a–8b are a block diagram of a preferred embodiment of the present invention
Figure 8:
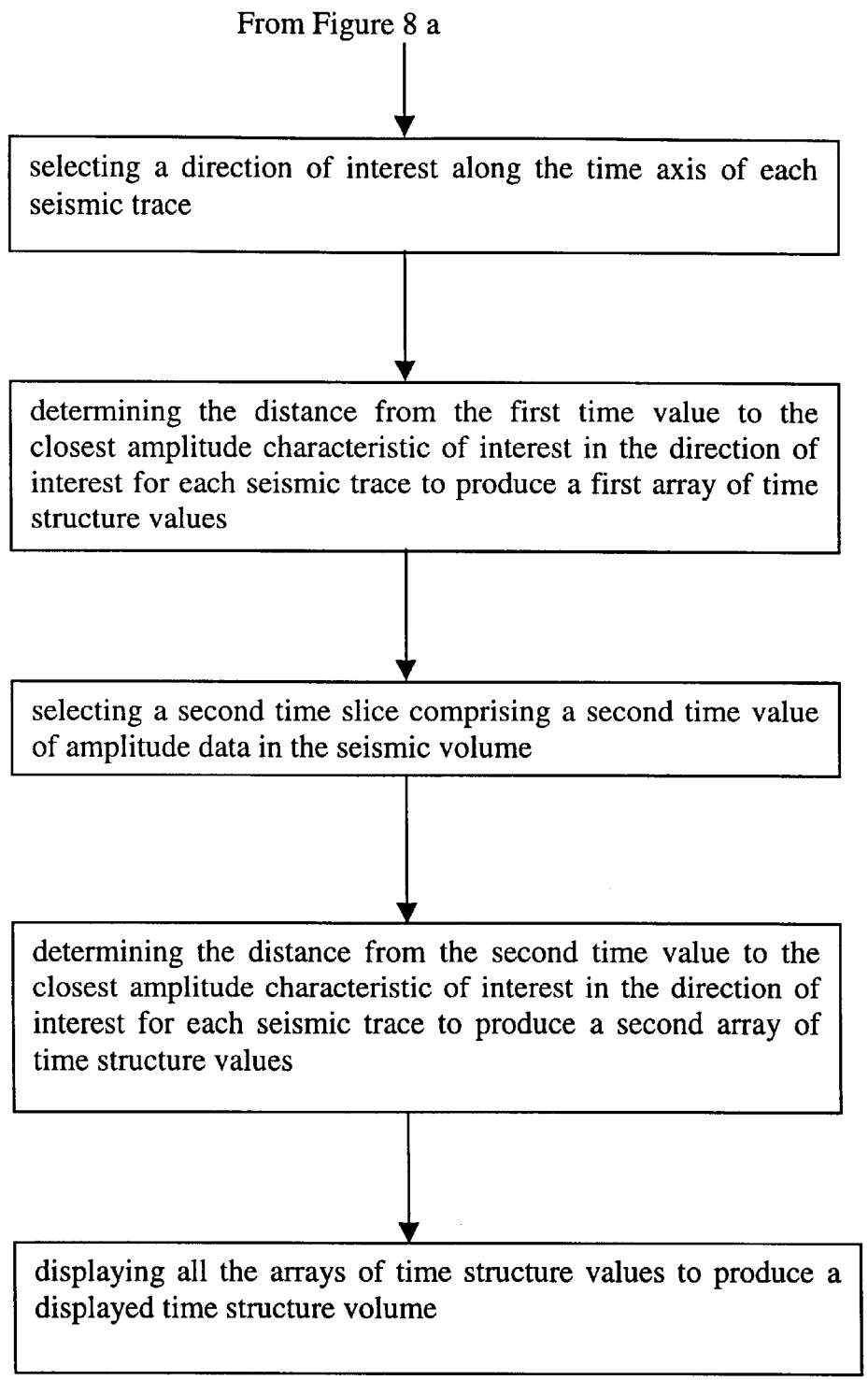

This preferred embodiment further comprises receiving a multiplicity of reflected acoustic signals from the earth, resulting from the prior transmitting step with a receiver array comprising at least three non-colinear receivers, as shown in block 12 of FIG. 8a. In one embodiment, the receivers are positioned to form a triangular array. In another embodiment, an N by N array of acoustic receivers is displaced over a target area. In this embodiment, N is an integer that is greater than or equal to two. In this embodiment, the acoustic receivers may be positioned to form a rectangular or square array. In another embodiment N is at least 10.

In one embodiment, the receiving is carried out for a time of at least 1.5 periods of the acoustic signal frequency, where the period is the inverse of the frequency. The receiving step may be carried out using receivers manufactured by Input/Output, Inc. of Stafford, Tex. or by Western-Geco, Inc. of Houston, Tex.

Figure 1:
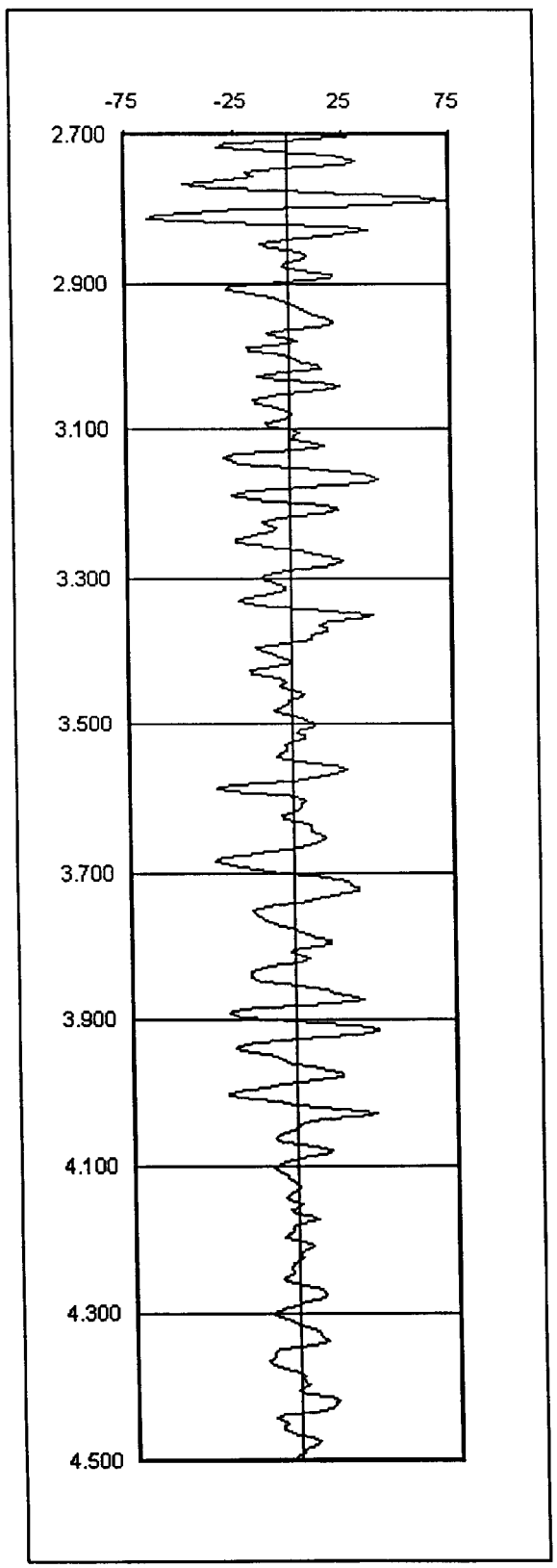
FIG. 1 is a temporal trace of a seismic echo depicting time on the vertical axis and amplitude on the horizontal axis.
Figure 2:
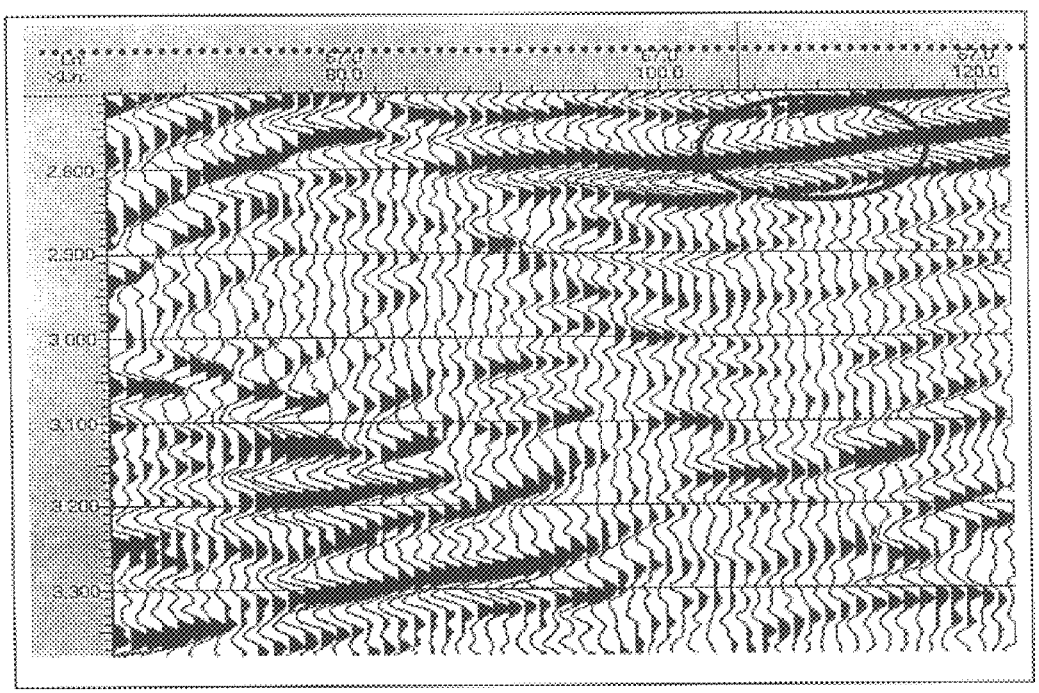
FIG. 2 is a plot of adjacent seismic traces of the type shown in FIG. 1.

This preferred embodiment further comprises recording the amplitude of each reflected acoustic signal as a function of time to construct a seismic volume comprised of a seismic trace for each recorded acoustic signal, as shown in block 14 of FIG. 8a. An example of a seismic trace is shown in FIG. 1. A multiplicity of seismic traces along a vertical plane constitute a seismic section, as shown in FIG. 2. The traces of FIG. 2 may be located along a line that is drawn along the Earth's surface.

In one preferred embodiment, the recording is carried out for a time of at least 1.5 periods of the acoustic signal frequency. In a preferred embodiment, the recording and receiving steps are carried out for time durations of the same length. In a preferred embodiment, the recording, or seismic sampling step, is executed in temporal intervals of two or four milliseconds.

Figure 6:
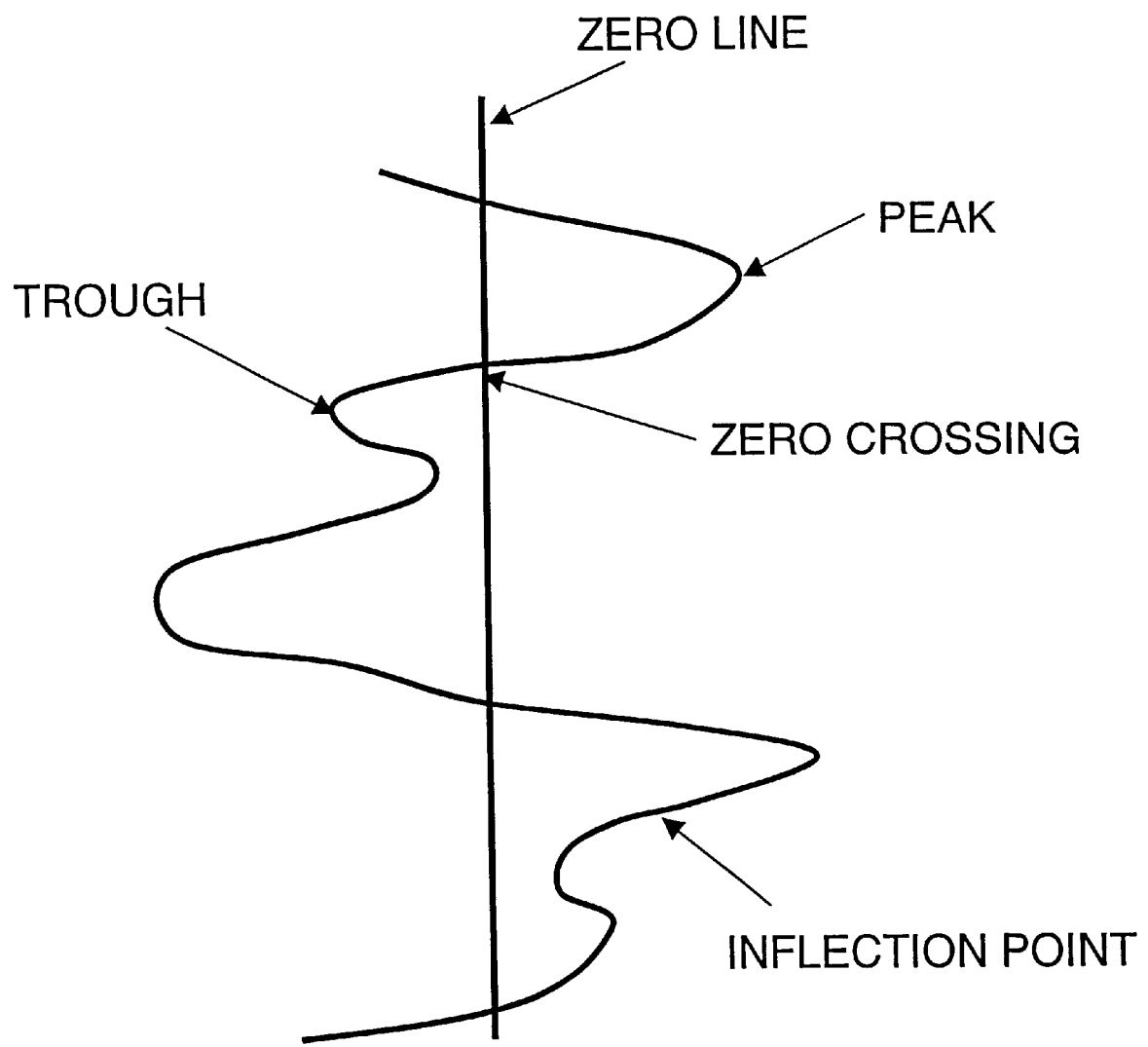
FIG. 6 is a graph of amplitude characteristics of interest as a function of time.

An amplitude characteristic of interest in the seismic volume is selected, as shown in block 16 of FIG. 8a. The amplitude characteristic of interest maybe a peak, a trough, or a zero crossing, as illustrated in FIG. 6.

In this preferred embodiment, the method further comprises identifying the time of each amplitude characteristic of interest for each seismic trace, as shown in block 18 of FIG. 8a. A first time value of amplitude data in the seismic volume is then selected, as shown in block 20 of FIG. 8a. This first time value is known as a "first time slice." A direction of interest along the time axis of each seismic trace is also selected, as shown in block 22 of FIG. 8b.

In a preferred embodiment, the identifying of the time of each amplitude characteristic of interest comprises using a mathematical method to derive an equation for amplitude as a function of time. In one preferred embodiment, the mathematical method comprises a quadratic interpolation. In another preferred embodiment, the mathematical method comprises a cubic spline method.

This preferred embodiment further comprises determining the distance from the first time value to the closest amplitude characteristic of interest in the direction of interest for each seismic trace to produce a first array of time structure values, as shown in block 24 of FIG. 8b.

A second time value of amplitude data in the seismic volume is then selected, as shown in block 26 of FIG. 8b. This second time value is known as a "second time slice."

This preferred embodiment further comprises determining the distance from the second time value to the closest amplitude characteristic of interest in the direction of interest for each seismic trace to produce a second array of time structure values, as shown in block 28 of FIG. 8b.

Figure 3:
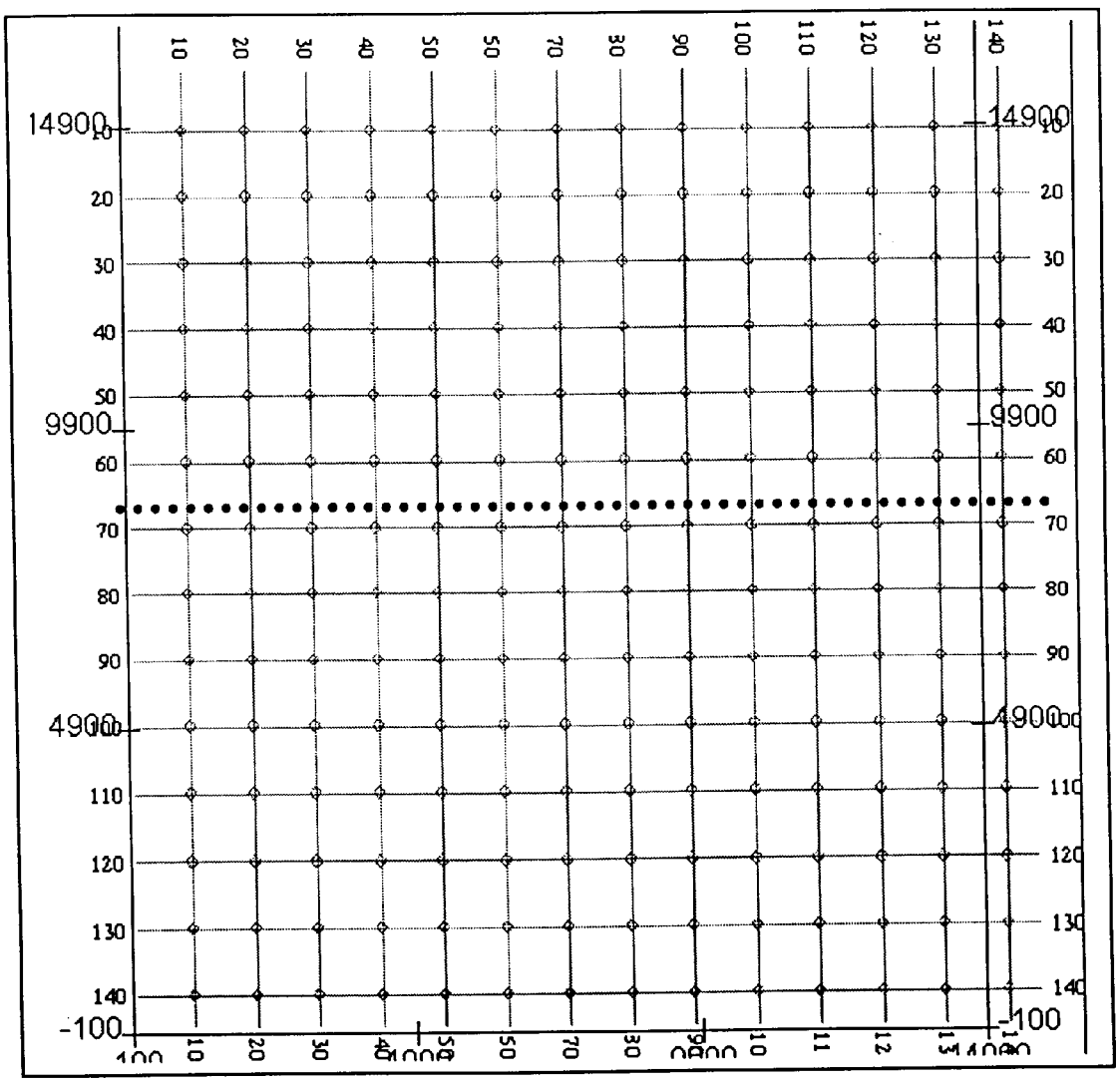
FIG. 3 is a grid depiction of seismic data in map view.
Figure 4:
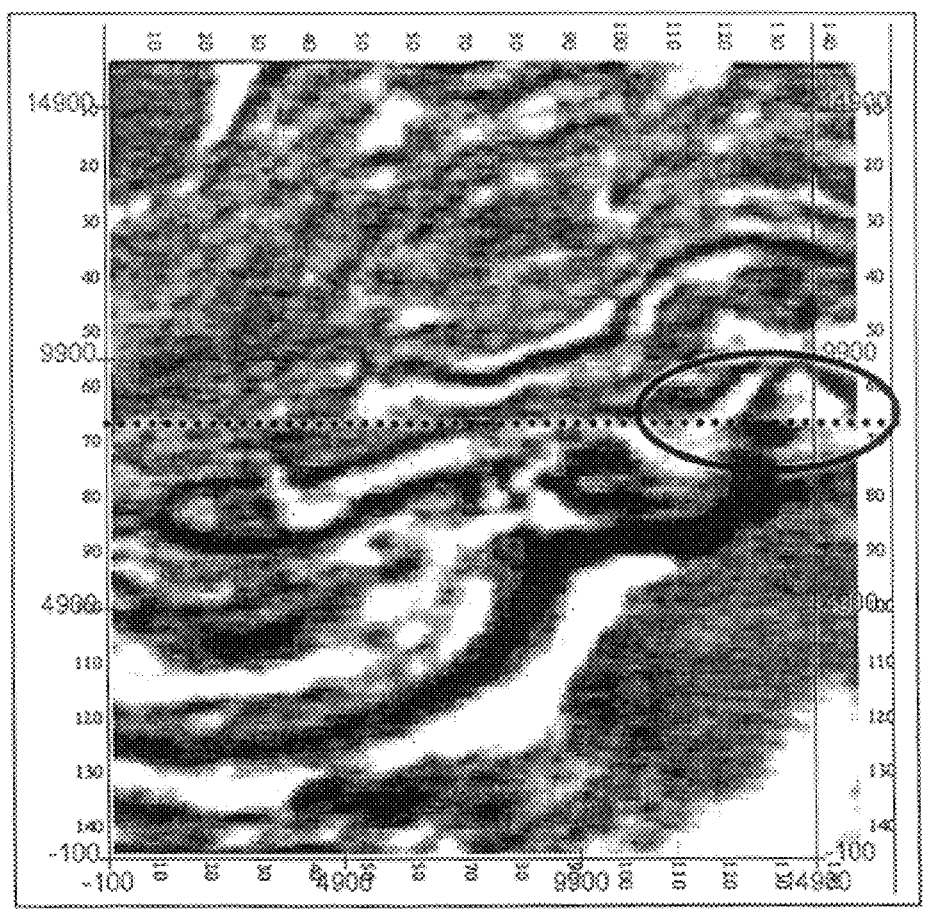
FIG. 4 is a gray scale display of amplitudes in the seismic volume at a selected time slice in the seismic volume.
Figure 5:
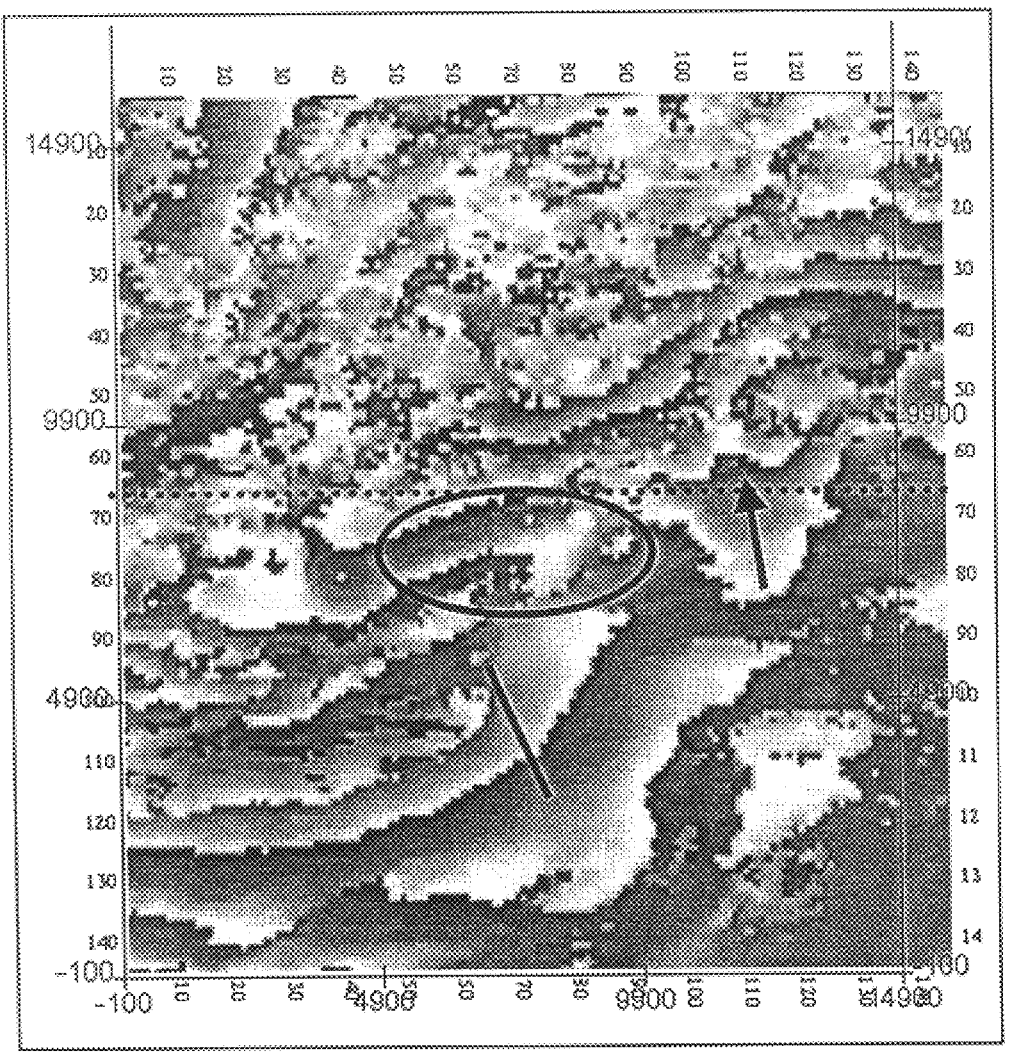
FIG. 5 is a time structure display of the data shown in FIGS. 2, 3, and 4.

FIG. 5 is a Time Structure display of the data shown in FIGS. 2, 3, and 4. FIG. 5 is a horizontal plane, or map, view of the data, similar to FIG. 4 and in contrast FIG. 2, which provides a vertical plane view of the data. The lighter areas represent reflection surfaces that are nearer, and darker areas represent reflection surfaces farther from the viewer. The gradation in brightness of the bands in FIG. 5 reveals that the majority are sheets tilted downward toward the upper left. For reference, an arrow pointing downhill is shown in FIG. 5. This figure is to be compared with FIG. 4, which is a common display of a time slice in a seismic volume. FIG. 4 shows a trend from lower left to upper right, but it shows neither the direction nor the degree of tilt.

Multiple arrays of time structure values may then be displayed to produce a displayed time structure volume. In one preferred embodiment, the displaying comprises assigning different gray scale values to different time structure values. In another preferred embodiment, the displaying comprises displaying different ranges of time structure values in different colors. In a preferred embodiment, all arrays of time structure values are displayed to produce a displayed time structure volume, as shown in block 30 FIG. 8b.

Figure 7:
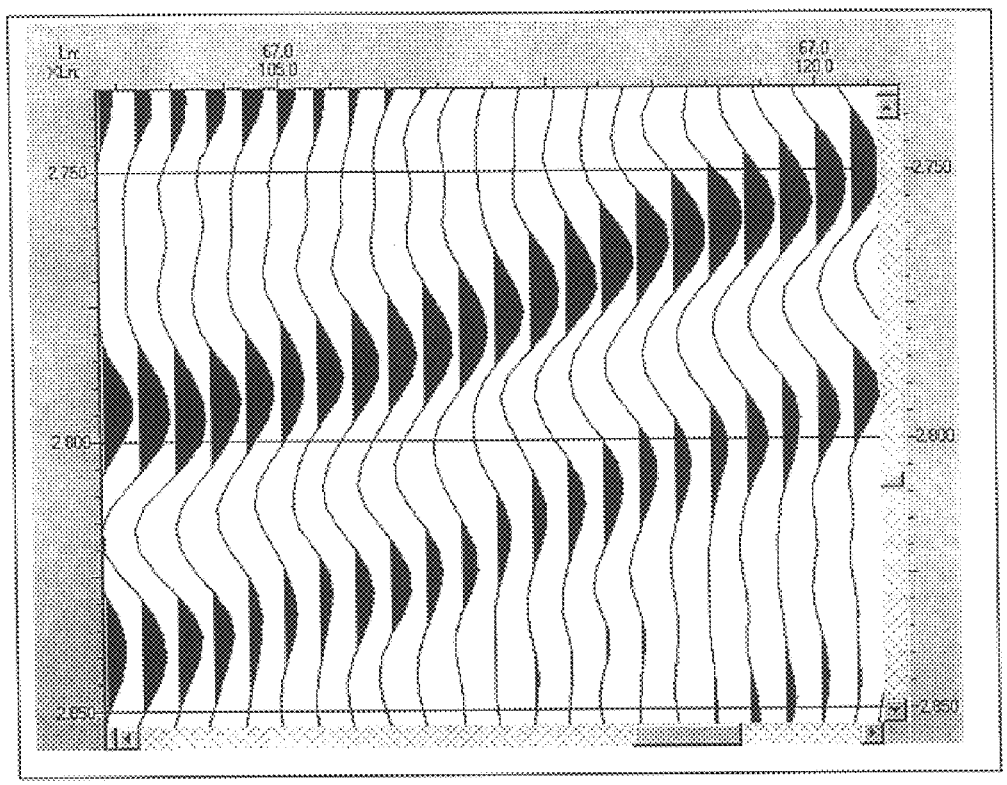
FIG. 7 is a enlarged version of the information plotted in FIG. 2 for illustrating the derivation of a time structure volume.

FIG. 7 may better illustrate how a time structure volume is derived. In this case one is looking for a peak relative to the time slice at 2.750 seconds. At the far right, the peak is very near this time and as one moves to the left, the distance to the peak increases. The invention records the times from the time slice to the peaks, and the increasing times appear, in FIG. 5 for example, as a sloping surface.

In a preferred embodiment, seismic volumes are typically stored as data files in a digital storage means, comprising one seismic volume per file. The files comprise the seismic traces, illustrated in FIG. 1. One or more traces may be read at a time. An algorithm is then applied to calculate the distance to the amplitude characteristic of interest. The resulting data may then be displayed as a seismic volume.

The above described embodiment of the present invention is directed toward displaying a time structure volume comprising at least a first array and a second array of time structure values. In other embodiments, the present invention provides a method for displaying more than two arrays of time structure values to produce a displayed time structure volume.

In one preferred embodiment, the invention comprises the steps described above as well as selecting a third time value of amplitude data in the seismic volume, known as a "third time slice," and determining the distance from the third time value to the closest amplitude characteristic of interest in the direction of interest for each seismic trace to produce a third array of time structure values. In this embodiment, the invention further comprises selecting a fourth time value of amplitude data in seismic volume, known as a "fourth time slice," and determining the data from the fourth time value to closest amplitude characteristic of interest in the direction of interest for each seismic trace to produce a fourth array of time structure values. In this embodiment, all four arrays of time structure values are displayed as a time structure volume. The method of the present invention may be adapted to any number of time slices and arrays of time structure values to be displayed in a time structure volume.

The foregoing disclosure and description of the invention are illustrative and explanatory. Various changes in the size, shape, and materials, as well as in the details of the illustrative construction may be made without departing from the spirit of the invention.

What is claimed is:

1. A method of processing seismic geophysical data to produce time structure volumes, comprising:
   a. transmitting an acoustic signal into the earth;
   b. receiving a multiplicity of reflected acoustic signals from the earth, resulting from the prior transmitting step with a receiver array comprising at least three non-colinear receivers;
   c. recording the amplitude of each reflected acoustic signal as a function of time to construct a seismic volume comprised of a seismic trace for each recorded acoustic signal;
   d. selecting an amplitude characteristic of interest in the seismic volume;
   e. identifying the time of each amplitude characteristic of interest for each seismic trace;
   f. selecting a first time slice comprising a first time value of amplitude data in the seismic volume;
   g. selecting a direction of interest along the time axis of each seismic trace;
   h. determining the distance from the first time value to the closest amplitude characteristic of interest in the direction of interest for each seismic trace to produce a first array of time structure values;
   i. selecting a second time slice comprising a second time value of amplitude data in the seismic volume;
   j. determining the distance from the second time value to the closest amplitude characteristic of interest in the direction of interest for each seismic trace to produce a second array of time structure values; and
   k. displaying all said arrays of time structure values to produce a displayed time structure volume.

2. The method of claim 1, wherein the amplitude characteristic of interest is a peak.

3. The method of claim 1, wherein the amplitude characteristic of interest is a trough.

4. The method of claim 1, wherein the amplitude characteristic of interest is a zero crossing.

5. The method of claim 1, wherein said identifying the time of each amplitude characteristic of interest comprises using a mathematical method to derive an equation for amplitude as a function of time.

6. The method of claim 5, wherein the mathematical method comprises a quadratic interpolation.

7. The method of claim 5, wherein the mathematical method comprises a cubic spline method.

8. The method of claim 1, wherein said displaying comprises assigning different gray scale values to different time structure values.

9. The method of claim 1, further comprising repeating steps (i) and (j) for a third and a fourth time slice.

10. A method of processing seismic geophysical data to produce time structure volumes, comprising:
   a. transmitting an acoustic signal into the earth from an acoustic source deployed over a target area;
   b. receiving a multiplicity of reflected acoustic signals from the earth, resulting from the prior transmitting step with a receiver array comprising N by N receivers, where N is an integer that is greater than or equal to two;
   c. recording the amplitude of each reflected acoustic signal as a function of time to construct a seismic volume comprised of a seismic trace for each recorded acoustic signal;
   d. selecting an amplitude characteristic of interest in the seismic volume;
   e. identifying the time of each amplitude characteristic of interest for each seismic trace;
   f. selecting a first time slice comprising a first time value of amplitude data in the seismic volume;
   g. selecting a direction of interest along the time axis of each seismic trace;
   h. determining the distance from the first time value to the closest amplitude characteristic of interest in the direction of interest for each seismic trace to produce a first array of time structure values;
   i. selecting a second time slice comprising a second time value of amplitude data in the seismic volume;
   j. determining the distance from the second time value to the closest amplitude characteristic of interest in the direction of interest for each seismic trace to produce a second array of time structure values; and k. displaying all said arrays of time structure values to produce a displayed time structure volume.

11. The method of claim 10, wherein the amplitude characteristic of interest is selected from the group consisting of a peak, a trough, and a zero crossing.

12. The method of claim 10, wherein said identifying the time of each amplitude characteristic of interest comprises using a mathematical method to derive an equation for amplitude as a function of time.

13. The method of claim 10, wherein said displaying comprises assigning different gray scale values to different time structure values.

14. The method of claim 10, wherein said displaying comprises displaying different ranges of time structure values in different colors.

15. The method of claim 10, wherein N is at least ten.

16. A method of processing seismic geophysical data to produce time structure volumes, comprising:

a. transmitting an acoustic signal into the earth from an acoustic source deployed over a target area;

b. receiving a multiplicity of reflected acoustic signals from the earth, resulting from the prior transmitting step with a receiver array comprising N by N receivers, where N is an integer that is greater than or equal to two, wherein said receiving is carried out for a time of at least 1.5 periods of the acoustic signal frequency;

c. recording the amplitude of each reflected acoustic signal as a function of time for a time at least 1.5 periods of the acoustic signal frequency to construct a seismic volume comprised of a seismic trace for each recorded acoustic signal;

d. selecting an amplitude characteristic of interest in the seismic volume;

e. identifying the time of each amplitude characteristic of interest for each seismic trace;

f. selecting a first time slice comprising a first time value of amplitude data in the seismic volume;

g. selecting a direction of interest along the time axis of each seismic trace;

h. determining the distance from the first time value to the closest amplitude characteristic of interest in the direction of interest for each seismic trace to produce a first array of time structure values;

i. selecting a second time slice comprising a second time value of amplitude data in the seismic volume;

j. determining the distance from the second time value to the closest amplitude characteristic of interest in the direction of interest for each seismic trace to produce a second array of time structure values; and k. displaying all said arrays of time structure values to produce a displayed time structure volume.

17. The method of claim 16, wherein said displaying comprises displaying different ranges of time structure values in different colors.

18. The method of claim 16, further comprising repeating steps (i) and (j) for a third and a fourth time slice.

19. The method of claim 16, wherein the amplitude characteristic of interest is a zero crossing.

20. A method of processing seismic geophysical data to produce depth structure volumes, comprising:

a. transmitting an acoustic signal into the earth;

b. receiving a multiplicity of reflected acoustic signals from the earth, resulting from the prior transmitting step with a receiver array comprising at least three non-colinear receivers;

c. recording the amplitude of each reflected acoustic signal as a function of depth to construct a seismic volume comprised of a seismic trace for each recorded acoustic signal;

d. selecting an amplitude characteristic of interest in the seismic volume;

e. identifying the depth of each amplitude characteristic of interest for each seismic trace;

f. selecting a first depth slice comprising a first depth value of amplitude data in the seismic volume;

g. selecting a direction of interest along the depth axis of each seismic trace;

h. determining the distance from the first depth value to the closest amplitude characteristic of interest in the direction of interest for each seismic trace to produce a first array of depth structure values;

i. selecting a second depth slice comprising a second depth value of amplitude data in the seismic volume;

j. determining the distance from the second depth value to the closest amplitude characteristic of interest in the direction of interest for each seismic trace to produce a second array of depth structure values; and k. displaying all said arrays of depth structure values to produce a displayed depth structure volume.

* * * * *